(12) United States Patent
Kato et al.

(10) Patent No.: US 8,058,384 B2
(45) Date of Patent: Nov. 15, 2011

(54) METHOD FOR PRODUCING THERMOPLASTIC RESIN, POLYESTER RESIN AND POLYCARBONATE RESIN, AND THEIR APPLICATIONS

(75) Inventors: Noriyuki Kato, Tokyo (JP); Toshiaki Yamada, Tokyo (JP); Shu Yoshida, Tokyo (JP); Jun Hagiwara, Tokyo (JP); Hiroki Furuhashi, Tokyo (JP); Kazuaki Kaneko, Tokyo (JP); Keiichi Kameyama, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 260 days.

(21) Appl. No.: 12/605,808

(22) Filed: Oct. 26, 2009

(65) Prior Publication Data

US 2010/0144995 A1    Jun. 10, 2010

(30) Foreign Application Priority Data

Oct. 27, 2008 (JP) ................. 2008-275098

(51) Int. Cl.
*C08G 63/52* (2006.01)
*C08G 63/66* (2006.01)
*C08G 64/04* (2006.01)

(52) U.S. Cl. .......... 528/196; 528/301; 525/469

(58) Field of Classification Search .......... 528/196, 528/301; 525/469
See application file for complete search history.

(56) References Cited

U.S. PATENT DOCUMENTS

| | | | |
|---|---|---|---|
| 5,530,086 A | 6/1996 | Fuji et al. | |
| 5,629,456 A | 5/1997 | Yamada et al. | |
| 5,633,331 A * | 5/1997 | Nichols et al. | 525/462 |
| 6,066,711 A | 5/2000 | Hanazawa et al. | |
| 6,884,559 B2 * | 4/2005 | Yokota | 430/119.6 |
| 7,781,540 B2 * | 8/2010 | Yanagida et al. | 525/466 |
| 2007/0093643 A1 * | 4/2007 | You et al. | 528/396 |

FOREIGN PATENT DOCUMENTS

| | | |
|---|---|---|
| JP | 10-101786 A | 4/1998 |
| JP | 10-101787 A | 4/1998 |
| JP | 2843214 B2 | 1/1999 |
| JP | 3331121 B2 | 10/2002 |
| JP | 2005-031610 | 2/2005 |

OTHER PUBLICATIONS

European Search Report for EP application No. 091742163 dated Dec. 28, 2009.

* cited by examiner

*Primary Examiner* — Tae H Yoon
(74) *Attorney, Agent, or Firm* — Birch, Stewart, Kolasch & Birch, LLP

(57) ABSTRACT

The invention relates to a method for producing a thermoplastic resin, comprising using a composition at least comprising a fluorene-containing dihydroxy compound represented by the following formula (1) and a fluorene-containing hydroxy compound represented by the following formula (2) in an amount of from 0.5 parts by weight to 1.5 parts by weight relative to 100 parts by weight of the fluorene-containing dihydroxy compound of formula (1).

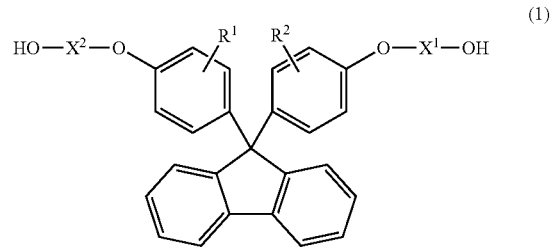

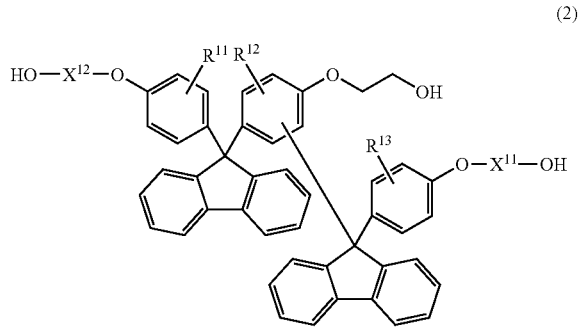

8 Claims, No Drawings

METHOD FOR PRODUCING THERMOPLASTIC RESIN, POLYESTER RESIN AND POLYCARBONATE RESIN, AND THEIR APPLICATIONS

CROSS-REFERENCE TO RELATED APPLICATIONS

This application claims benefit of priority under 35 U.S.C. 119 to Japanese Patent Application No. 2008-275098, filed on Oct. 27, 2008, which is expressly incorporated herein by reference in its entirety.

BACKGROUND OF THE INVENTION

1. Technical Field

The present invention relates to a method for producing thermoplastic resin. The invention also relates to a polyester resin and a polycarbonate resin produced according to the method, and to applications of those resins.

2. Background Art

Thermoplastic resins such as polycarbonate resin having a bisphenoxyethanol-fluorene skeleton (Japanese Patent Nos. 2843214 and 3331121) and polyester resin (JP-A Nos. 10-101787 and 10-101786) are excellent in low birefringence and heat resistance and are variously used as optical materials.

SUMMARY OF THE INVENTION

However, the mechanical strength of these resins is relatively poor and their applications are limited. In addition, the resins have another problem in that the yield in continuously shaping them is low. Accordingly, it is desired to enhance the mechanical strength of the resins.

The present inventors have assiduously studied for the purpose of producing a thermoplastic resin having a fluorene skeleton and excellent in strength, and as a result, have found that it is effective to use, as a monomer, a composition comprising a fluorene-containing dihydroxy compound represented by formula (1) and a specific compound in a specific amount, and on the basis of this finding, the inventors have made the present invention.

Specifically, the invention relates to a method for producing a thermoplastic resin, which comprises using a composition at least comprising a fluorene-containing dihydroxy compound represented by formula (1) and a fluorene-containing hydroxy compound represented by formula (2) in an amount of from 0.5 parts by weight to 1.5 parts by weight relative to 100 parts by weight of the fluorene-containing dihydroxy compound of formula (1), for producing a thermoplastic resin such as polyester resin, polycarbonate resin, etc.

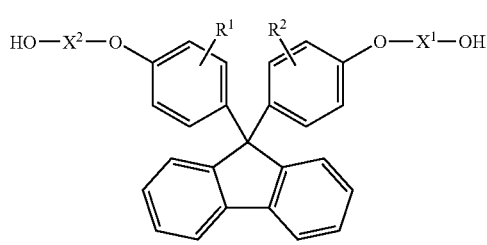

(1)

In formula (1), $R^1$ and $R^2$ each independently represent a hydrogen atom or a methyl group; and $X^1$ and $X^2$ each independently represent a $C_{2-4}$ alkylene group.

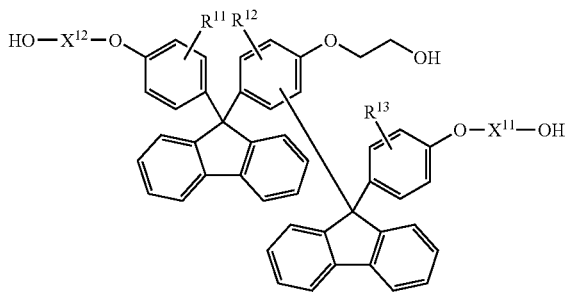

(2)

In formula (2), $R^{11}$, $R^{12}$ and $R^{13}$ each independently represent a hydrogen atom or a methyl group; and $X^{11}$ and $X^{12}$ each independently represents a $C_{2-4}$ alkylene group.

According to the invention, there is provided a thermoplastic resin having a fluorene skeleton and having a high mechanical strength. Also according to the invention, there are provided a polyester resin and a polycarbonate resin having a fluorene skeleton and a high mechanical strength and suitable to optical applications.

DETAILED DESCRIPTION OF THE INVENTION

The invention relates to a method for producing a thermoplastic resin having a fluorene skeleton. The invention is characterized by using a composition containing a fluorene-containing dihydroxy compound of formula (1) and a fluorene-containing hydroxy compound of formula (2).

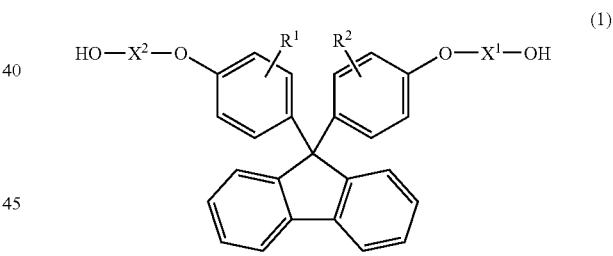

(1)

In formula (1), $R^1$ and $R^2$ each independently represent a hydrogen atom or a methyl group; and $X^1$ and $X^2$ each independently represent a $C_{2-4}$ alkylene group.

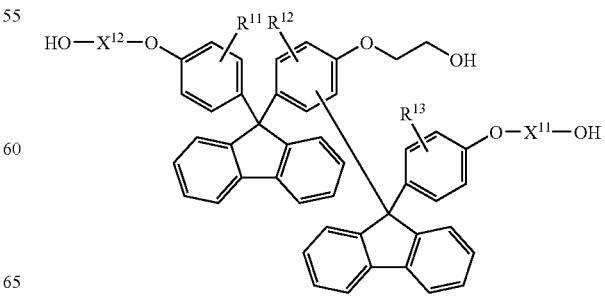

(2)

In formula (2), $R^{11}$, $R^{12}$ and $R^{13}$ each independently represent a hydrogen atom or a methyl group; and $X^{11}$ and $X^{12}$ each independently represents a $C_{2-4}$ alkylene group.

Examples of the compound represented by formula (1) include 9,9-bis (4-(2-hydroxy ethoxy)phenyl fluorene, 9,9-bis(4-(2-hydroxy ethoxy)-3-methyl phenyl fluorene, 9,9-bis(4-(2-hydroxy ethoxy)-3,5-dimethyl phenyl fluorene, 9,9-bis(4-(2-hydroxy ethoxy)-3-tert-butyl phenyl)fluorene, 9,9-bis(4-(2-hydroxy ethoxy)-3-isopropyl phenyl)fluorene, 9,9-bis(4-(2-hydroxy ethoxy)-3-cyclohexyl phenyl)fluorene and 9,9-bis(4-(2-hydroxy propoxy)phenyl fluorene. According to the invention, one type of the compound of formula (1) may be used aloe or plural types of the compound of formula (1) may be used in combination.

In the production method of the invention, used is a composition comprising a fluorene-containing hydroxy compound of formula (2) along with a compound of formula (1) in an amount of from 0.5 parts by weight to 1.5 parts by weight relative to 100 parts by weight of the compound of formula (1). When the content of the compound of formula (2) falls within the above-mentioned range, then the mechanical strength of the thermoplastic resin such as polyester resin and polycarbonate resin produced may have an enhanced mechanical strength (as compared with the strength of the resin produced in a case where the content of the compound (2) falls without the range), and in addition, the strength of the resin does not fluctuate; or that is, the production method gives a thermoplastic resin having a stably enhanced mechanical strength. Using the composition that comprises the compound of formula (2) to fall within the above-mentioned range has little influence on the intrinsic properties of the thermoplastic resin produced, and may often contribute toward enhancing the properties of the resin.

The compound of formula (1) may contain the compound of formula (2) as an impurity that is side-produced in the process of producing it; and in such a case, the reaction condition in producing the compound of formula (1) and the purification condition after its production are suitably determined so that the content of the compound of formula (2) in the product could fall within the above-mentioned range, whereby a composition containing the compound of formula (2) in the above-mentioned ratio can be prepared. The content of the compound of formula (2) tends to increase at a higher reaction temperature and for a longer period of reaction time. On the other hand, there may be a case where the compound of formula (1) contains the compound of formula (2) in an amount less than the above-mentioned range, or does not contain it at all; and in such a case, the compound of formula (2) may be intentionally added to the compound of formula (1) to thereby prepare a composition containing the compound of formula (2) in a ratio falling within the above-mentioned range. The compound of formula (2) to be added may be, for example, one obtained by partitioning in high-performance liquid chromatography (HPLC) or the like.

According to one example of the method for producing a thermoplastic resin having a fluorene skeleton of the invention, the composition containing a fluorene-containing dihydroxy compound represented by formula (1) and a fluorene-containing hydroxy compound represented by formula (2), wherein $X^1$ and $X^2$ in formula (1) and $X^{11}$ and $X^{12}$ in formula (2) are ethylene, is used, that is, the composition containing a fluorene-containing dihydroxy compound represented by formula (1)' and a fluorene-containing hydroxy compound represented by formula (2)' is used.

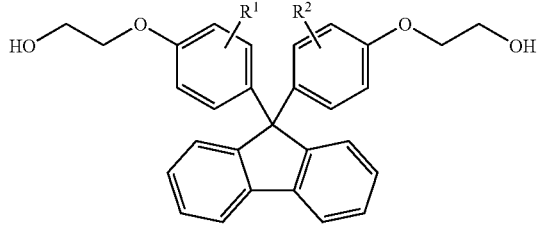

In formula (1)', $R^1$ and $R^2$ each independently represent a hydrogen atom or a methyl group.

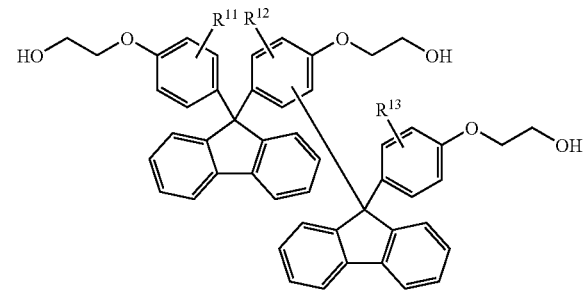

In formula (2)', $R^{11}$, $R^{12}$ and $R^{13}$ each independently represent a hydrogen atom or a methyl group.

One embodiment of the production method of the invention is for producing a polyester resin. In this embodiment, used is a composition at least comprising a diol component containing at least a compound of formula (1) and a dicarboxylic acid component containing a dicarboxylic acid and/or its reactive derivative. In this embodiment, the diol component reacts with the dicarboxylic acid component to produce a polyester resin. In this embodiment, the compound of formula (2) may participate in the reaction, serving as a diol component, or may remain unreacted.

The diol component and the dicarboxylic acid compound to be used in this embodiment may be each in the form of a single component thereof or may also be a mixture containing two or more different compounds of a diol component and/or a dicarboxylic component as copolymerization components.

Examples of the other diol compound, which can be used as the diol component along with the compound represented by formula (1), include alkylene glycols (e.g. linear or branched chain $C_{2-12}$ alkylene glycols such as ethylene glycol, propylene glycol, trimethylene glycol, 1,3-butane diol, tetramethylene glycol (1,4-butane diol), hexane diol, neopentyl glycol, octane diol and decane diol); and (poly)oxy alkylene glycols (e.g. diethylene glycol, triethylene glycol and dipropylene glycol). Each of these diol compounds may be used alone or in combination with other diol(s).

Preferably the diol compound, which can be used along with the compound represented by formula (1), is selected from linear or branched chain $C_{2-12}$ alkylene glycols, more preferably selected from linear or branched chain $C_{2-6}$ alkylene glycols, and even more preferably selected from linear or branched chain $C_{2-4}$ alkylene glycols (e.g. ethylene glycol, propylene glycol and tetramethylene glycol (1,4-butane diol)).

In many cases, at least ethylene glycol is used as the diol component.

The other diol (e.g., ethylene glycol) is useful as a copolymerization component for enhancing the polymerization reactivity and for making the produced resin flexible. Introduction of a copolymerization component may often lower the refractive index, the heat resistance and the water absorbability of the produced resin; and from this viewpoint, in general, the copolymerization ratio is preferably small.

The ratio of the diol of formula (1) to the other diol, or that is, the ratio (by mol) of diol of formula (1)/other diol may be selected from a range of from 100/0 to 10/90 or so. In general, the range may be from 99/1 to 50/50 or so, preferably from 99/1 to 60/40 or so, more preferably from 99/1 to 70/30. or so.

The dicarboxylic acid component includes dicarboxylic acids, dicarboxylic acid derivatives (dicarboxylic acid derivatives capable of forming an ester bond, that is, ester-forming dicarboxylic acid derivatives), etc. One or more different types of dicarboxylic acid components may be used either singly or as combined. For example, as the dicarboxylic acid component, usable are a dicarboxylic acid and its derivative.

Examples of the typical dicarboxylic acid include aliphatic dicarboxylic acids such as alkane dicarboxylic acids (e.g. oxalic acid, malonic acid, succinic acid, glutaric acid and adipic acid) and alkene dicarboxylic acids (e.g. maleic acid and fumaric acid); alicyclic dicarboxylic acids such as cycloalkane dicarboxylic acids (e.g. cyclohexane dicarboxylic acid) and di- or tri-cycloalkane dicarboxylic acid (e.g. decalin dicarboxylic acid, norbornene dicarboxylic acid and adamantane dicarboxylic acid); and aromatic dicarboxylic acids such as arene dicarboxylic acids (e.g. terephthalic acid, isophthalic acid, phthalic acid, 2,6-naphthalene dicarboxylic acid, 1,8-naphthalene dicarboxylic acid and anthracene dicarboxylic acid) and biphenyl dicarboxylic acid (e.g. 2,2'-biphenyl dicarboxylic acid). Any reactive derivatives thereof, that is, any derivatives thereof, which can form ester bond(s), such as anhydrides thereof (e.g. hexahydro phthalic acid anhydride and tetrahydro phthalic acid anhydride), low (e.g. $C_{1-4}$) alkyl esters thereof (e.g. dimethyl esters thereof and diethyl esters thereof) and acid halides corresponding to the dicarboxylic acid, may be also used.

Each of these dicarboxylic acids may be used alone or in combination with the other dicarboxylic acid(s). Among these, cyclohexane dicarboxylic acid and terephthalic acid are preferable in terms of their low cost and easily-industrial availabilities.

The ratio of the dicarboxylic acid component to the diol component, or that is, dicarboxylic acid component/diol component (by mol) may be selected from a range of from 1.5/1 to 0.7/1 or so, preferably from 1.2/1 to 0.8/1 or so, more preferably from 1.1/1 to 0.9/1 or so.

In the production method for a polyester resin in this embodiment, the content of the fluorene-containing dihydroxy compound of formula (1) to be in the composition is preferably at least 60% by weight relative to the weight of the entire diol component in the composition. Specifically, in the polyester resin, the content of the constitutive unit containing the residue derived from the fluorene-containing dihydroxy compound of formula (1) is preferably at least 60% by weight relative to all the constitutive units. The "constitutive unit containing the residue derived from the fluorene-containing dihydroxy compound of formula (1)" is meant to indicate a constitutive unit containing an ester bond —COO— and comprising a residue of the compound of formula (1) and a dicarboxylic acid residue. For example, in case where any other diol compound is used than the fluorene-containing dihydroxy compound of formula (1), the resulting polyester resin shall contain "a constitutive unit containing the residue of the other diol component" in addition to the "constitutive unit containing the residue derived from the fluorene-containing dihydroxy compound of formula (1)"; and in such a case, the proportion of the "constitutive unit containing the residue derived from the fluorene-containing dihydroxy compound of formula (1)" is preferably at least 60% by weight in all the constitutive units containing an ester bond. When the proportion of the compound of formula (1) is defined to fall within the above-mentioned range, then a polyester resin excellent in optical properties such as refractivity can be produced. Regarding the mechanical strength of the resin, the content of the compound of formula (1) is preferably higher since the modulus of elasticity of the resin could be higher; however, when the content is too high, then the tensile elongation of the resin may low. Accordingly, the content of the compound of formula (1) is preferably at most 90% by weight or so.

In this embodiment, a dicarboxylic acid component (dicarboxylic acid and/or ester-forming dicarboxylic acid derivative) and a diol component containing a compound of formula (1) are reacted in various methods of a melt polymerization method, a solution polymerization method, an interfacial polymerization method or the like for interesterification, direct polymerization or the like, thereby giving a polyester resin. Above all, preferred is a melt polymerization method not using a reaction solvent.

The interesterification method is a type of a melt polymerization method, and this comprises reacting a dicarboxylate and a diol compound in the presence of a catalyst for interesterification with removing the formed alcohol by evaporation, thereby giving a polyester; and in general, the method is used for production of a polyester resin.

The direct polymerization method comprises reacting a dicarboxylic acid and a diol compound through dehydration to give an ester compound followed by interesterification with removing the excessive diol compound by evaporation under reduced pressure to give a polyester resin. The advantage of the direct polymerization method is that an inexpensive dicarboxylic acid can be used as the starting material with no evaporation of alcohol like in interesterification. Regarding the type of the polymerization catalyst and the amount thereof, the polymerization condition such as temperature and others, and the additives such as heat stabilizer, etherification inhibitor, catalyst inactivator and others in carrying out the melt polymerization methods, referred to are those for known methods.

The weight-average molecular weight of the polyester resin produced in this embodiment is generally from 20,000 to 60,000 or so. In an embodiment of using the polymer for optical applications, the weight-average molecular weight of the polymer is preferably from 20,000 to 70,000 or so, more preferably from 25,000 to 60,000 or so.

Another embodiment of the invention is a production method for a polycarbonate resin. In this embodiment, used is a composition comprising a dihydroxy component that contains at least a compound of formula (1), a diester carbonate component, and a catalyst such as a basic compound catalyst, an interesterification catalyst, a mixed catalyst of the two or the like. In this embodiment, the dihydroxy component and the diester carbonate component are reacted in the presence of the catalyst to give a polycarbonate resin. In this embodiment, the compound of formula (2) may participate in the reaction, serving as a dihydroxy component, or may remain unreacted.

The dihydroxy component and the diester carbonate component to be used in this embodiment may be each in the form of a single component thereof or may also be a mixture containing two or more different compounds of a dihydroxy component and/or a diester carbonate component as copolymerization components.

Examples of the dihydroxy compound, which can be used as the dihydroxy component along with the compound represented by formula (1), include liner diols such as ethylene glycol, 1,3-propane diol, 1,4-butane diol, 1,5-pentane diol and 1,6-hexane diol; and cyclic diols such as tricyclo[$5.2.1.0^{2,6}$]decanedimethanol, 4,10-dimethyl tricyclo[$5.2.1.0^{2,6}$]decanedimethanol, 4,4,10,10-tetra tricyclo[$5.2.1.0^{2,6}$]decanedimethanol, 1,2,3,4,5,6,7,8,9,10-decamethyl tricyclo[$5.2.1.0^{2,6}$]decanedimethanol, 3,9-bis(2-hydroxy ethyl)-2,4,8,10-tetraoxo spiro(5.5)undecane, 3,9-bis(2-hydroxy-1,1-diethylethyl)-2,4,8,10-tetraoxa spiro(5.5) undecane, 3,9-bis(2-hydroxy-1,1-dipropylethyl)-2,4,8,10-tetraoxa spiro (5.5)undecane, and 1,4-cyclohexane diol (trans- or cis-body or any mixtures thereof). Each of these dihydroxy compound may be used alone or in combination with the other dihydroxy compound(s).

Examples of the bisphenol, which can be used along with the compound represented by formula (1), include 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butyl phenyl)propane, 2,2-bis(4-hydroxy-3-methylphenyl)propane, 1,1-bis(4-hydroxyphenyl)cyclopentane, 1,1-bis(4-hydroxyphenyl)cyclohexane, 2,2-bis(4-hydroxyphenyl) hexafluoro propane, bis(4-hydroxyphenyl)diphenyl methane, 1,1-bis(4-hydroxyphenyl)-1-phenylethane, 9,9-bis(4-hydroxyphenyl)fluorene, 9,9-bis(4-hydroxy-3-methylphenyl)fluorene, $\alpha,\omega$-bis[2-(p-hydroxyphenyl)ethyl]polydimethylsiloxane, $\alpha,\omega$-bis[3-(o-hydroxy phenyl)propyl]polydimethylsiloxane, 4,4'-[1,3-phenylene bis(1-methyl ethylidene)]bisphenol and 1,1-bis(4-hydroxy phenyl)-1-phenylethane. Each of these may be used alone or in combination with the other(s). Among these, 2,2-bis(4-hydroxyphenyl) propane (bisphenol A: BPA) is especially preferable.

Examples of the diester carbonate include diphenyl carbonate, ditolyl carbonate, bis(chlorophenyl)carbonate, m-cresyl carbonate, dimethyl carbonate, diethyl carbonate, dibutyl carbonate and dicyclohexyl carbonate. Among these, diphenyl carbonate is especially preferable.

Preferably, the diester carbonate such as diphenyl carbonate or the like is used in a ratio of from 0.90 to 1.15 mols or so relative to one mol of the total of the dihydroxy compounds, more preferably in a ratio of from 0.95 to 1.05 mols or so.

In the production method for a polycarbonate resin in this embodiment, the content of the fluorene-containing dihydroxy compound of formula (1) to be in the composition is preferably at least 60% by weight relative to the weight of the entire dihydroxy component in the composition. Specifically, in the polycarbonate resin, the content of the constitutive unit containing the residue derived from the fluorene-containing dihydroxy compound of formula (1) is preferably at least 60% by weight relative to all the constitutive units. The "constitutive unit containing the residue derived from the fluorene-containing dihydroxy compound of formula (1)" is meant to indicate a constitutive unit containing a carbonate bond —O—CO—O— and comprising a residue of the compound of formula (1) and a diester carbonate residue. For example, in case where any other dihydroxy compound is used than the fluorene-containing dihydroxy compound of formula (1), the resulting polycarbonate resin shall contain "a constitutive unit containing the residue of the other hydroxy component" in addition to the "constitutive unit containing the residue derived from the fluorene-containing dihydroxy compound of formula (1)"; and in such a case, the proportion of the "constitutive unit containing the residue derived from the fluorene-containing dihydroxy compound of formula (1)" is preferably at least 60% by weight in all the constitutive units containing a carbonate bond. When the proportion of the compound of formula (1) is defined to fall within the above-mentioned range, then a polycarbonate resin excellent in optical properties such as refractivity can be produced. Regarding the mechanical strength of the resin, the content of the compound of formula (1) is preferably higher since the modulus of elasticity of the resin could be higher; however, when the content is too high, then the tensile elongation of the resin may low. Accordingly, the content of the compound of formula (1) is preferably at most 90% by weight or so.

In the production method for a polycarbonate resin in this embodiment, a dihydroxy compound component is reacted with a diester carbonate component in the presence of a catalyst. Examples of the usable catalyst include a basic compound catalyst, an interesterification catalyst, and a mixed catalyst of the two.

The basic compound catalyst includes an alkali metal compound and/or an alkaline earth metal compound, a nitrogen-containing compound, etc.

Preferred examples of the basic compound catalyst include organic acid salts, inorganic salts, oxides, hydroxides, hydrides or alkoxides of alkali metal or alkaline earth metal compounds or the like, as well as quaternary ammonium hydroxides and their salts, amines, etc. One or more of these compounds may be used herein either singly or as combined.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borophenylate, sodium benzoate, potassium benzoate, cesium benzoate, lithium benzoate, disodium hydrogenphosphate, dipotassium hydrogenphosphate, dilithium hydrogenphosphate, disodium phenylphosphate, bisphenol A disodium, bisphenol A dipotassium, bisphenol A dicesium, bisphenol A dilithium, phenol sodium, phenol potassium, phenol cesium and phenol lithium.

Examples of the alkaline-earth metal compound include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenylphosphate.

Examples of the nitrogen-containing compound include quaternary ammonium hydroxides having an alkyl or aryl such as tetramethylammonium hydroxide, tetraethylammonium hydroxide, tetrapropylammonium hydroxide, tetrabutylammonium hydroxide and trimethylbenzylammonium hydroxide; tertiary amines such as triethyl amine, dimethyl benzyl amine and triphenyl amine; secondary amines such as diethyl amine and dibutyl amine; primary amines such as propyl amine and butyl amine; imidazoles such as 2-methyl imidazole, 2-phenyl imidazole and benzoimidazole; and bases or basic salts such as ammonia, tetramethylammonium borohydride, tetrabutylammonium borohydride, tetrabutylammonium tetraphenylborate and tetraphenylammonium tetraphenylborate.

As an interesterification catalyst, zinc salts, tin salts, zirconium salts and lead salts are preferable; and each of these may be used alone or in combination with the other(s).

Examples of the interesterification catalyst include zinc acetate, zinc benzoate, zinc 2-ethylhexanate, tin(II) chloride, tin(IV) chloride, tin(II) acetate, tin(IV) acetate, dibutyltin dilaurate, dibutyltin oxide, dibutyltin dimethoxide, zirconium acetylacetonato, zirconium oxyacetate, zirconium tetrabutoxide, lead(II) acetate and lead(IV) acetate.

The catalyst may be used in an amount of generally from $10^{-9}$ to $10^{-3}$ mols or so relative to 1 mol of the total of the dihydroxy compounds, preferably from $10^{-7}$ to $10^{-4}$ mots or so.

In this embodiment, a dihydroxy component and a diester carbonate component are reacted in the presence of the above-mentioned catalyst according to a melt polycondensation method to give a polycarbonate resin. In the melt polycondensation method, the above-mentioned materials are reacted in the presence of the catalyst through interesterification under heat and under normal pressure or reduced pressure for melt polycondensation with removing the side product. The reaction is generally two or more multi-stage reaction. One example of the melt polycondensation method is described below.

The first stage reaction is attained at a temperature of 120 to 220° C., preferably from 160 to 200° C., for 1 to 5 hours, preferably for 0.5 to 3 hours, under normal pressure to a pressure of 200 Torr. Next, the temperature is gradually elevated up to a final temperature of from 230 to 260° C. while the pressure is gradually reduced to a final pressure of at most 1 Torr, taking 1 to 3 hours, and the reaction is continued. Finally, under the reduced pressure of at most 1 Torr, the polycondensation is promoted at a temperature of from 230 to 260° C., and after the reaction system comes to have a predetermined viscosity, the pressure in the system is restored and the reaction is thus finished. The reaction time taken under at most 1 Torr is from 0.1 to 2 hours, and the overall reaction time is from 1 to 6 hours, generally from 2 to 5 hours.

The reaction may be continuous reaction or batchwise reaction. The reaction apparatus for use for the above-mentioned reaction may be a vertical reactor equipped with an anchor-type stirring blade, a Maxblend stirring blade, a helical ribbon-type stirring blade or the like, or may be a horizontal reactor equipped with a paddle blade, a lattice blade, an eyeglass blade or the like; and preferred is a reaction apparatus constructed by suitably combining these reactors in consideration of the viscosity of the polymer product.

After the polymerization reaction, preferably, the catalyst is removed or inactivated so as not to detract from the thermal stability and the hydrolysis stability of the obtained polycarbonate resin. In general, a known acidic substance may be added to inactivate the catalyst. Examples of the acidic substance to be used for inactivating the catalyst include aromatic sulfonic acids such as p-toluenesulfonic acid; aromatic sulfonate esters such as butyl p-toluenesulfonate and hexyl p-toluenesulfonate; aromatic sulfonate salts such as tetrabutylphosphonium dodecylbenzenesulfonate; organic halogen compounds such as stearyl chloride, benzoyl chloride and p-toluenesulfonic chloride; alkyl sulfuric acids such as dimethyl sulfuric acid; and organic halogen compounds such as benzyl chloride.

The catalyst inactivation may be followed by a step of removing the low-boiling-point compound from the polymer through vaporization under a pressure of from 0.1 to 1 Torr and at a temperature of from 200 to 350° C. For this step, preferably used is a horizontal reactor equipped with a stirring blade excellent in the surface renewal capability such as a paddle blade, a lattice blade, an eyeglass blade or the like, or a thin-film evaporator.

The weight-average molecular weight of the polycarbonate resin produced in this embodiment is generally from 2,000 to 100,000 or so. In an embodiment of using the polymer for optical applications, the weight-average molecular weight of the polymer is preferably from 5,000 to 70,000 or so, more preferably from 10,000 to 50,000 or so.

The composition comprising compounds of formulae (1) and (2) in a predetermined ratio for use in the production method of the invention may contain various additives in addition to the monomer components and the catalyst used in the above-mentioned embodiments. For example, antioxidant, pigment, dye, reinforcing agent, filler, UV absorbent, lubricant, release agent, nucleating agent, plasticizer, flowability improver, antistatic agent, antimicrobial agent and others may be added to the composition in addition to the above-mentioned heat stabilizer and hydrolysis stabilizer thereto.

The thermoplastic resin such as polyester resin, polycarbonate resin and the like produced according to the production method of the invention may be used in various applications. According to the production method of the invention, there may be provided a thermoplastic resin having enhanced strength not detracting from the properties intrinsic to the resin. Accordingly, thermoplastic resins heretofore used in various applications may be substituted with thermoplastic resins produced according to the production method of the invention, enhancing their strength not detracting from the properties intrinsic to them. In particular, the thermoplastic resins produced according to the production method of the invention are useful as materials for optical members such as optical films, optical discs, optical prisms, optical lenses, etc. Resin materials for use for optical applications are required to have a high transmittance and a high refractivity, and are often required to have a high mechanical strength. Examples of the thermoplastic resin to be produced according to the production method of the invention are a polyester resin and a polycarbonate resin, and these thermoplastic resins have a maximum stress of from 50 MPa to 110 MPa (more preferably from 60 MPa to 100 MPa), a total light transmittance of at least 87% (more preferably at least 88%), and a refractive index to d-ray at 23° C. of at least 1.58 (preferably at least 1.60), and are favorable for optical applications.

EXAMPLES

The invention is described with reference to the following Examples. Unless otherwise specifically indicated, "%" and "part" in Examples are by weight. The physical properties of the polyesters and polycarbonates obtained in the following Examples were measured as follows:

Polystyrene-Based Weight-Average Molecular Weight (Mw):

The resin sample is analyzed through GPC, using chloroform as a developing solvent and based on a standard polystyrene having a known molecular weight (molecular weight distribution=1), thereby preparing a calibration curve thereof. Based on the calibration curve, the average-weight molecular weight of the sample is computed from the retention time in GPC.

Total Light Transmittance:

The resin sample is press-shaped into a rectangular parallelepiped piece of 3 mm thick×8 mm×8 mm, and analyzed with Nippon Denshoku Kogyo's MODEL 1001DP.

Refractive Index:

The resin sample is press-shaped into a rectangular parallelepiped piece of 3 mm thick×8 mm×8 mm, and analyzed with Atago's refractiometer.

Flexural Strength:

The resin sample is cut into a strip piece having a thickness of 3.2 mm, and using Shimadzu Seisakusho's autograph AG500B Model, this is tested for bending according to JISK-7110 at room temperature and at a bending speed of 1.5 mm/min, and its flexural strength is determined.

Quantification of the Fluorene-Containing Hydroxy Compound of formula (2) in the Compound of Formula (1):

10 mg of the sample is dissolved in 10 mL of methanol. Using Tosoh's column, "ODS-80ts" and using a solvent of methanol/water, this is analyzed through high-performance liquid chromatography at a wavelength of 254 nm. The gradient program is 0 to 5 minutes (methanol 70%), 5 to 30 minutes (methanol 70% to 100%), and 30 to 45 minutes (methanol 100%). The HPLC data are processed to give a calibration curve, on which the content of the compound is read.

The compound of formula (2) is identified through H-NMR (DMSO solvent: 3.70 (8H, t), 3.90 (8H, t), 6.80 (8H, t), 7.00 (8H, t), 7.36 (4H, t), 7.40 (8H, t), 7.70 (4H, t)), and through mass spectrometry (Mw: 754.3).

1. Production Example 1

150.6 g (0.84 mmol) of fluorenone having a purity of 99.5% by weight and 460.6 g (3.32 mol) of phenoxyethanol (by Yokkaichi Gosei) were put into a chamber having an inner capacity of 2000 mL and equipped with a stirrer, a condenser tube and a burette, then 2.18 g (0.02 mol) of β-mercaptopropionic acid was added to it, and 239.1 g of 100% sulfuric acid was dropwise added thereto taking 3 hours. Next, the reaction was continued for 24 hours while the reaction temperature was kept at 75° C. After the reaction, 664 g of methanol was added to the reaction liquid, which was then kept stirred for 1 hour. This was cooled overnight to precipitate a reaction product, which was then separated through filtration. The resulting solid was washed with methanol, and dissolved under heat in toluene. The organic layer was washed twice with water. The organic layer was cooled for recrystallization, and the resulting crystal was dried. Thus obtained, the purity of 9,9-bis(4-(2-hydroxyethoxy)phenyl)fluorene was 96.1%, and that of the compound (2) was 1.60%; and the yield was 82%.

2. Production Example 2

In this, the process was the same as in Production Example 1 except that the reaction temperature was 60° C. and the reaction time was 6 hours. Thus obtained, the purity of 9,9-bis(4-(2-hydroxyethoxy)phenyl)fluorene was 97.1%, and that of the compound (2) was 1.45%; and the yield was 79%.

3. Production Example 3

9,9-Bis(4-2-hydroxyethoxy)phenyl)fluorene obtained in Production Example 2 was recrystallized three times from toluene, then filtered and dried. Thus obtained, the purity of 9,9-bis(4-(2-hydroxyethoxy)phenyl)fluorene was 98.1%, and that of the compound (2) was 0.25%.

4. Production Example 4

The compound (2) partitioned in HPLC was added to the 9,9-bis(4-(2-hydroxyethoxy)phenyl)fluorene obtained in Production Example 3. Thus obtained, the purity of 9,9-bis(4-(2-hydroxyethoxy)phenyl)fluorene was 97.5%, and that of the compound (2) was 0.41%.

5. Example 1

Production of Polyester A 52 g (0.30 mol) of 1,4-cyclohexanedicarboxylic acid, 41 g (0.66 mol) of ethylene glycol, and 120 g (0.27 mol) of 9,9-bis[4-(2-hydroxyethoxy)phenyl]fluorene containing 1.45% of the compound of formula (2) were put into a reactor, and gradually heated and melted therein with stirring for esterification, and then 0.06 parts by weight of germanium oxide was added thereto. This was gradually heated to reach 270° C. and not higher than 1 Torr, and ethylene glycol was removed under reduced pressure. Next, the contents were taken out of the reactor, and fluorene skeleton-having copolyester resin pellets were thus obtained.

90 mol % of the diol component introduced into the obtained polyester resin was one derived from 9,9-bis[4-(2-hydroxyethoxy)phenyl]fluorene.

The weight-average molecular weight Mw of the polyester resin was 41000, the total light transmittance thereof was 88%, and the refractive index thereof was 1.632. The flexural strength of the resin was 85 MPa.

6. Example 2

Production of Polyester A'

Fluorene skeleton-having copolyester resin pellets were produced in the same manner as in Example 1, for which, however, 9,9-bis[4-(2-hydroxyethoxy)phenyl]fluorene containing 0.41% of the compound of formula (2) was used.

The weight-average molecular weight Mw of the polyester resin was 42000, the total light transmittance thereof was 89%, and the refractive index thereof was 1.632. The flexural strength of the resin was 84 MPa.

7. Example 3

Production of Polyester B 58 g (0.35 mol) of terephthalic acid, 41 g (0.67 mol) of ethylene glycol, and 92 g (0.62 mol) of 9,9-bis[4-(2-hydroxyethoxy)phenyl]fluorene prepared to contain 1.45% of the compound of formula (2) were put into a reactor, then gradually heated with stirring to reach 270° C. and not higher than 1 Torr, and ethylene glycol was removed under reduced pressure. Next, the contents were taken out of the reactor, and fluorene skeleton-having copolyester resin pellets were thus obtained.

70 mol % of the diol component introduced into the obtained polyester resin was one derived from 9,9-bis[4-(2-hydroxyethoxy)phenyl]fluorene.

The weight-average molecular weight Mw of the polyester resin was 38000, the total light transmittance thereof was 89%, and the refractive index thereof was 1.607. The flexural strength of the resin was 81 MPa.

8. Example 4

Production of Polyester B'

Fluorene skeleton-having copolyester resin pellets were produced in the same manner as in Example 3, for which, however, 9,9-bis[4-(2-hydroxyethoxy)phenyl]fluorene containing 0.41% of the compound of formula (2) was used.

The weight-average molecular weight Mw of the polyester resin was 38500, the total light transmittance thereof was 89%, and the refractive index thereof was 1.607. The flexural strength of the resin was 83 MPa.

9. Example 5

Production of Polycarbonate A 19.18 g (0.0437 mol) of 9,9-bis(4-(2-hydroxyethoxy)phenyl)fluorene containing 1.45% of the compound of formula (2), 11.75 g (0.0459 mol) of diphenyl carbonate, and 0.0268 g ($3.19 \times 10^{-4}$ mol) of sodium hydrogencarbonate were put into a 50-liter reactor equipped with a stirrer and a distillation unit, and stirred under heat at 215° C. for 1 hour in a nitrogen atmosphere under 760 Torr. Next, the pressure was reduced to 150 Torr, taking 15 minutes, and this was kept under 150 Torr at 215° C. for 20 minutes for interesterification. Further, this was heated up to 240° C. at a heating rate of 37.5° C./hr, and kept at 240° C. under 150 Torr for 10 minutes. Next, the pressure was reduced to 120 Torr, taking 10 minutes, and this was kept at 240° C. under 120 Torr for 70 minutes. Next, the pressure was reduced to 100 Torr, taking 10 minutes, and this was kept at 240° C. under 100 Torr for 10 minutes. Further, the pressure was reduced to 1 Torr, taking 40 minutes, and this was stirred at 240° C. under 1 Torr for 10 minutes for polymerization. After the reaction, the pressure inside the reactor was increased by introducing nitrogen thereinto, and the formed polycarbonate resin was taken out while pelletized.

The weight-average molecular weight Mw of the polycarbonate resin was 24300, the total light transmittance thereof was 90%, and the refractive index thereof was 1.634. The flexural strength of the resin was 84 MPa.

10. Example 6

Production of Polycarbonate A'

Fluorene skeleton-having polycarbonate resin pellets were produced in the same manner as in Example 5, for which, however, 9,9-bis[4-(2-hydroxyethoxy)phenyl]fluorene containing 0.41% of the compound of formula (2) was used.

The weight-average molecular weight Mw of the polycarbonate resin was 25000, the total light transmittance thereof was 89%, and the refractive index thereof was 1.634. The flexural strength of the resin was 85 MPa.

11. Example 7

Production of Polycarbonate B 43.9 g (0.100 mol) of 9,9-bis(4-(2-hydroxyethoxy)phenyl) fluorene (BPEF) prepared to contain 1.45% of the compound of formula (2), 19.6 g (0.100 mol) of tricyclo[$5.2.1.0^{2,6}$]decanedimethanol (TCDDM), 43.7 g (0.204 mol) of diphenyl carbonate and $1.0 \times 10^{-4}$ g ($1.2 \times 10^{-6}$ mol, added as aqueous 0.1% solution) of sodium hydrogen carbonate were put into a 50-liter reactor equipped with a stirrer and a distillation unit, and processed for polymerization in the same manner as in Example 5.

The weight-average molecular weight Mw of the polycarbonate resin was 24300, the total light transmittance thereof was 89%, and the refractive index thereof was 1.603. The flexural strength of the resin was 86 MPa.

12. Example 8

Production of Polycarbonate B'

Fluorene skeleton-having copolyester resin pellets were produced in the same manner as in Example 7, for which, however, 9,9-bis[4-(2-hydroxyethoxy)phenyl]fluorene containing 0.41% of the compound of formula (2) was used.

The weight-average molecular weight Mw of the polycarbonate resin was 24900, the total light transmittance thereof was 89%, and the refractive index thereof was 1.603. The flexural strength of the resin was 83 MPa.

13. Comparative Examples 1 and 2

Production of Polyester A" and Polyester A'"

Polyester resins were produced through polymerization in the same manner as in Example 1, for which, however, the compound (1) containing 1.60% (Comparative Example 1) or 0.25% (Comparative Example 2) of the compound (2) was used.

The weight-average molecular weight Mw, the total light transmittance, the refractive index and the flexural strength of the obtained polyester resins were measured, and the data are shown in Table 1 below.

14. Comparative Examples 3 and 4

Production of Polyester B" and Polyester B'"

Polyester resins were produced through polymerization in the same manner as in Example 3, for which, however, the compound (1) containing 1.60% (Comparative Example 3) or 0.25% (Comparative Example 4) of the compound (2) was used.

The weight-average molecular weight Mw, the total light transmittance, the refractive index and the flexural strength of the obtained polyester resins were measured, and the data are shown in Table 1 below.

15. Comparative Examples 5 and 6

Production of Polycarbonate A" and Polycarbonate A'"

Polycarbonate resins were produced through polymerization in the same manner as in Example 5, for which, however, the compound (1) containing 1.60% (Comparative Example 5) or 0.25% (Comparative Example 6) of the compound (2) was used.

The weight-average molecular weight Mw, the total light transmittance, the refractive index and the flexural strength of the obtained polycarbonate resins were measured, and the data are shown in Table 1 below.

16. Comparative Examples 7 and 8

Production of Polycarbonate B" and Polycarbonate B'"

Polycarbonate resins were produced through polymerization in the same manner as in Example 7, for which, however, the compound (1) containing 1.60% (Comparative Example 7) or 0.25% (Comparative Example 8) of the compound (2) was used.

The weight-average molecular weight Mw, the total light transmittance, the refractive index and the flexural strength of the obtained polycarbonate resins were measured, and the data are shown in Table 1 below.

TABLE 1

| | Thermoplastic resin | Mw | Compound (2) Content (%) | Flexural strength (MPa) | Total light transmittance (%) | nD |
|---|---|---|---|---|---|---|
| Example 1 | Polyester A | 41000 | 1.45 | 85 | 88 | 1.632 |
| Example 2 | Polyester A' | 42000 | 0.41 | 84 | 89 | 1.632 |
| Example 3 | Polyester B | 38000 | 1.45 | 81 | 89 | 1.607 |
| Example 4 | Polyester B' | 38500 | 0.41 | 83 | 89 | 1.607 |
| Example 5 | Polycarbonate A | 24300 | 1.45 | 84 | 90 | 1.634 |
| Example 6 | Polycarbonate A' | 25000 | 0.41 | 85 | 89 | 1.634 |
| Example 7 | Polycarbonate B | 24300 | 1.45 | 86 | 90 | 1.603 |
| Example 8 | Polycarbonate B' | 24900 | 0.41 | 83 | 89 | 1.603 |
| Comparative Example 1 | Polyester A'' | 40000 | 1.60 | 32 | 89 | 1.632 |
| Comparative Example 2 | Polyester A''' | 39000 | 0.25 | 35 | 87 | 1.632 |
| Comparative Example 3 | Polyester B'' | 39000 | 1.60 | 39 | 90 | 1.607 |
| Comparative Example 4 | Polyester B''' | 41000 | 0.25 | 37 | 89 | 1.607 |
| Comparative Example 5 | Polycarbonate A'' | 25100 | 1.60 | 45 | 89 | 1.634 |
| Comparative Example 6 | Polycarbonate A''' | 24900 | 0.25 | 43 | 90 | 1.634 |
| Comparative Example 7 | Polycarbonate B'' | 23900 | 1.60 | 48 | 90 | 1.603 |
| Comparative Example 8 | Polycarbonate B''' | 24400 | 0.25 | 44 | 89 | 1.603 |

The data in the above Table confirm that the polyesters and the polycarbonates produced in Examples according to the production method of the invention where a composition containing a compound of formula (1) and a compound of formula (2) in a predetermined ratio is used have a higher mechanical strength (more than 50 MPa) as compared with the polyesters and the polycarbonates in Comparative Examples in which the content of compound of formula (2) does not falling within the scope of the invention. Further, the data confirm that the polyesters and the polycarbonates in Examples all have a high light transmittance (a total light transmittance of more than 87%) and a high refractive index (a refractive index of more than 1.60 to d-ray at 23° C.), and are therefore useful as a resin material for optical applications.

The invention stably provides a high-strength thermoplastic resin useful for various applications, especially for optical applications.

What is claimed is:

1. A method for producing a thermoplastic resin, comprising using a composition at least comprising a fluorene-containing dihydroxy compound represented by the following formula (1) and a fluorene-containing hydroxy compound represented by the following formula (2) in an amount of from 0.5 parts by weight to 1.5 parts by weight relative to 100 parts by weight of the fluorene-containing dihydroxy compound of formula (1):

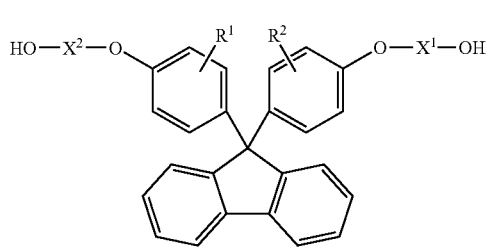

(1)

wherein $R^1$ and $R^2$ each independently represent a hydrogen atom or a methyl group; and $X^1$ and $X^2$ each independently represent a $C_{2-4}$ alkylene group;

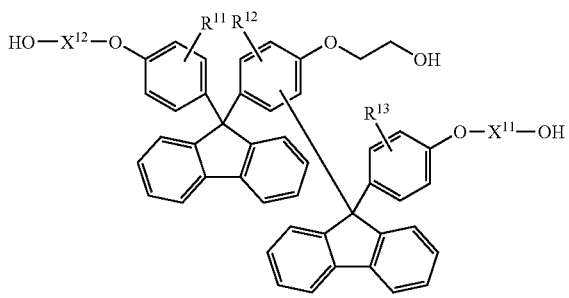

(2)

wherein $R^{11}$, $R^{12}$ and $R^{13}$ each independently represent a hydrogen atom or a methyl group; and $X^{11}$ and $X^{12}$ each independently represents a $C_{2-4}$ alkylene group.

2. The method of claim 1, wherein $X^1$ and $X^2$ in formula (1) and $X^{11}$ and $X^{12}$ in formula (2) each are an ethylene group.

3. The method for producing a polyester resin of claim 1, wherein the content of the constitutive unit containing the residue derived from the fluorene-containing dihydroxy compound of formula (1) in the polyester resin is equal to or more than 60% by weight of all the constitutive units in the resin.

4. The method for producing a polycarbonate resin of claim 1, wherein the content of the constitutive unit containing the residue derived from the fluorene-containing dihydroxy compound of formula (1) in the polycarbonate resin is equal to or more than 60% by weight of all the constitutive units in the resin.

5. A polyester resin produced according to the method of claim 3, which has a maximum stress of from 50 MPa to 110 MPa, a total light transmittance of at least 87%, and a refractive index to d-ray at 23° C. of at least 1.60.

6. A polycarbonate resin produced according to the method of claim 4, which has a maximum stress of from 50 MPa to 110 MPa, a total light transmittance of at least 87%, and a refractive index to d-ray at 23° C. of at least 1.60.

7. An optical member at least comprising the polyester resin of claim 5.

8. An optical member at least comprising the polycarbonate resin of claim 6.

* * * * *